US012600334B2

(12) United States Patent
Ahn

(10) Patent No.: US 12,600,334 B2
(45) Date of Patent: Apr. 14, 2026

(54) ELECTRONIC BRAKE DEVICE

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 297 days.

(21) Appl. No.: 17/834,434

(22) Filed: Jun. 7, 2022

(65) Prior Publication Data

US 2023/0009546 A1 Jan. 12, 2023

(30) Foreign Application Priority Data

Jul. 9, 2021 (KR) ........................ 10-2021-0090423

(51) Int. Cl.
| | |
|---|---|
| *B60T 13/74* | (2006.01) |
| *B60T 8/40* | (2006.01) |
| *B60T 8/88* | (2006.01) |
| *B60T 8/94* | (2006.01) |
| *B60T 13/14* | (2006.01) |
| *B60T 13/58* | (2006.01) |
| *B60T 13/68* | (2006.01) |

(52) U.S. Cl.
CPC .............. *B60T 8/94* (2013.01); *B60T 8/4081* (2013.01); *B60T 8/885* (2013.01); *B60T 13/148* (2013.01); *B60T 13/58* (2013.01); *B60T 13/686* (2013.01); *B60T 13/745* (2013.01); *B60T 2201/03* (2013.01); *B60T 2220/04* (2013.01); *B60T 2270/402* (2013.01); *B60T 2270/413* (2013.01)

(58) Field of Classification Search
CPC ................. B60T 13/686; B60T 13/745; B60T 2270/402; B60T 2270/413; B60T 8/94; B60T 8/4081; B60T 8/885; B60T 13/148; B60T 13/58; B60T 2201/03; B60T 2204/04
See application file for complete search history.

(56) References Cited

U.S. PATENT DOCUMENTS

| | | | | |
|---|---|---|---|---|
| 11,919,500 | B2* | 3/2024 | Ganzel | ................... B60T 8/366 |
| 2016/0264113 | A1* | 9/2016 | Feigel | ................... B60T 8/4086 |

(Continued)

FOREIGN PATENT DOCUMENTS

| | | |
|---|---|---|
| CN | 108883755 A | 11/2018 |
| CN | 110177720 A | 8/2019 |

(Continued)

OTHER PUBLICATIONS

Extended European Search Report Issued Nov. 23, 2022 in corresponding European Application No. 22177766.7.

(Continued)

*Primary Examiner* — Bradley T King
(74) *Attorney, Agent, or Firm* — NovoTechIP International PLLC

(57) ABSTRACT

The present disclosure provides an electronic hydraulic brake system that can appropriately provide redundancy braking force, that is, an electronic hydraulic brake system that provides a so-called redundancy function, in the situation in which a driver does not drive or gives less attention to driving such as autonomous driving or smart cruise control and a main braking device malfunctions.

3 Claims, 8 Drawing Sheets

(56) References Cited

U.S. PATENT DOCUMENTS

| 2019/0241167 | A1* | 8/2019 | Peichl | B60T 13/165 |
|---|---|---|---|---|
| 2019/0344769 | A1* | 11/2019 | Zimmermann | B60T 8/326 |
| 2019/0351886 | A1* | 11/2019 | Besier | B60T 7/042 |
| 2020/0079335 | A1* | 3/2020 | Linhoff | B60T 8/321 |
| 2020/0139949 | A1* | 5/2020 | Dolmaya | B60T 8/4081 |
| 2020/0406880 | A1* | 12/2020 | Zimmermann | B60T 17/221 |
| 2021/0146900 | A1 | 5/2021 | Einig et al. | |
| 2021/0155215 | A1* | 5/2021 | Ganzel | B60T 11/20 |
| 2021/0179051 | A1 | 6/2021 | Alford et al. | |
| 2022/0194339 | A1* | 6/2022 | Tarandek | B60T 13/145 |
| 2023/0145707 | A1* | 5/2023 | Lim | B60T 8/4081 |
| | | | | 303/119.1 |
| 2023/0146790 | A1* | 5/2023 | Kim | B60T 8/267 |
| | | | | 303/3 |
| 2023/0174034 | A1* | 6/2023 | Kim | B60T 8/1755 |
| | | | | 701/70 |
| 2023/0398971 | A1* | 12/2023 | Ahn | B60T 8/94 |
| 2023/0398972 | A1* | 12/2023 | Ahn | B60T 13/142 |
| 2024/0001899 | A1* | 1/2024 | Stanojkovski | B60T 13/686 |
| 2024/0001901 | A1* | 1/2024 | Ganzel | B60T 13/142 |
| 2024/0067150 | A1* | 2/2024 | Stanojkovski | B60T 13/745 |
| 2024/0083402 | A1* | 3/2024 | Kim | B60T 13/148 |
| 2024/0101093 | A1* | 3/2024 | Ohira | B60T 7/042 |
| 2024/0132039 | A1* | 4/2024 | Yang | B60T 13/686 |

FOREIGN PATENT DOCUMENTS

| CN | 112105533 | A | 12/2020 |
|---|---|---|---|
| WO | 2020204510 | A1 | 10/2020 |

OTHER PUBLICATIONS

Office Action Issued Sep. 13, 2023 in corresponding European Application No. 22177766.7.
Office Action issued on Dec. 24, 2025 in corresponding Chinese Patent Application No. 202210793166.8.

* cited by examiner

ELECTRONIC BRAKE DEVICE

CROSS-REFERENCE TO RELATED APPLICATIONS

This application claims the benefit of priority to Korean Patent Application No. 10-2021-0090423, filed on Jul. 9, 2021, the disclosure of which is incorporated herein by reference in its entirety.

BACKGROUND

1. Technical Field

The present disclosure relates to an electronic hydraulic brake device and, more particularly, an electronic hydraulic brake device that can perform redundancy braking.

2. Discussion of Related Art

Description of this section only provides the background information of embodiments without configuring the related art.

In general, an electronic hydraulic brake system adjusts the braking pressure of each wheel using a hydraulic modulator after pedal pressure by a driver is sensed through a sensor.

An electronic hydraulic brake system includes a sensor that senses the stroke distance of a pedal to be able to know the braking pressure that a driver wants, and a pedal simulator that enables a driver to feel pedal pressure such as in a common hydraulic brake system.

A control unit determines braking force required by a driver through a pedal stroke sensor, a pressure sensor, etc., and generates braking force at a wheel brake by driving a specific wheel brake unit.

A wheel brake unit usually includes a main master cylinder structure for generating hydraulic pressure, and a hydraulic circuit and valves for transmitting hydraulic pressure generated by the main master to brake devices mounted on wheels of a vehicle.

FIG. 8 is a block diagram showing an example of an electronic hydraulic brake system of the related art.

The electronic hydraulic brake system of the related art shown in FIG. 8 is configured to perform not only a fundamental function for providing a reaction feeling to a driver while sensing the degree of pedal effort by the driver by means of a pedal simulator, but a function of a backup master cylinder for providing redundancy braking force when a main braking device malfunctions.

That is, a hydraulic circuit and valves are disposed so that a brake can be driven by pedal effort from a driver even though a main master cylinder that is driven by a motor does not work in a fallback mode that is the situation in which power is not supplied to a brake system or there is a problem with the function of an electric actuator, an electronic control valve, etc.

However, an electronic hydraulic brake system of the related art is configured to provide physical braking force by a person under the assumption that a drive basically keeps paying attention to surrounding objects while driving even in the fallback mode. That is, according to an electronic hydraulic brake system of the related art, for example, when a vehicle is driven in a smart cruise control mode or an autonomous mode, a driver does not quickly take measures against malfunction of the braking device and misses the timing for physically operating a pedal, which may result in a large accident.

Further, since an electronic hydraulic brake system of the related art is not equipped with a pressure-increasing means such as a pressure booster on a backup master cylinder, there is a difficulty in that even if a driver depresses a brake pedal at appropriate timing, braking pressure and inclination of an increase thereof are not generated to be suitable for emergency braking.

SUMMARY

According to at least one aspect, the present disclosure provides an electronic brake comprising: a plurality of wheel brake units supplying braking force to wheels of a vehicle; a main braking device configured to generate pressure of brake oil in cooperation with a main braking motor; a secondary braking device configured to generate pressure of brake oil in cooperation with a secondary braking motor; a hydraulic circuit valve device configured to selectively transmit the pressure of brake oil generated by the main braking device or the secondary braking device to the plurality of wheel brake units; a main controller configured to control the main braking motor of the main braking device in accordance with braking input; and an assistant controller configured to control the secondary braking motor of the secondary braking device in accordance with braking input and to control the hydraulic circuit valve device to transmit the pressure of brake oil generated by the secondary braking device to only some wheel brake units of the plurality of wheel brake units when the main controller or the main braking device malfunctions.

DETAILED DESCRIPTION

Figure 1:
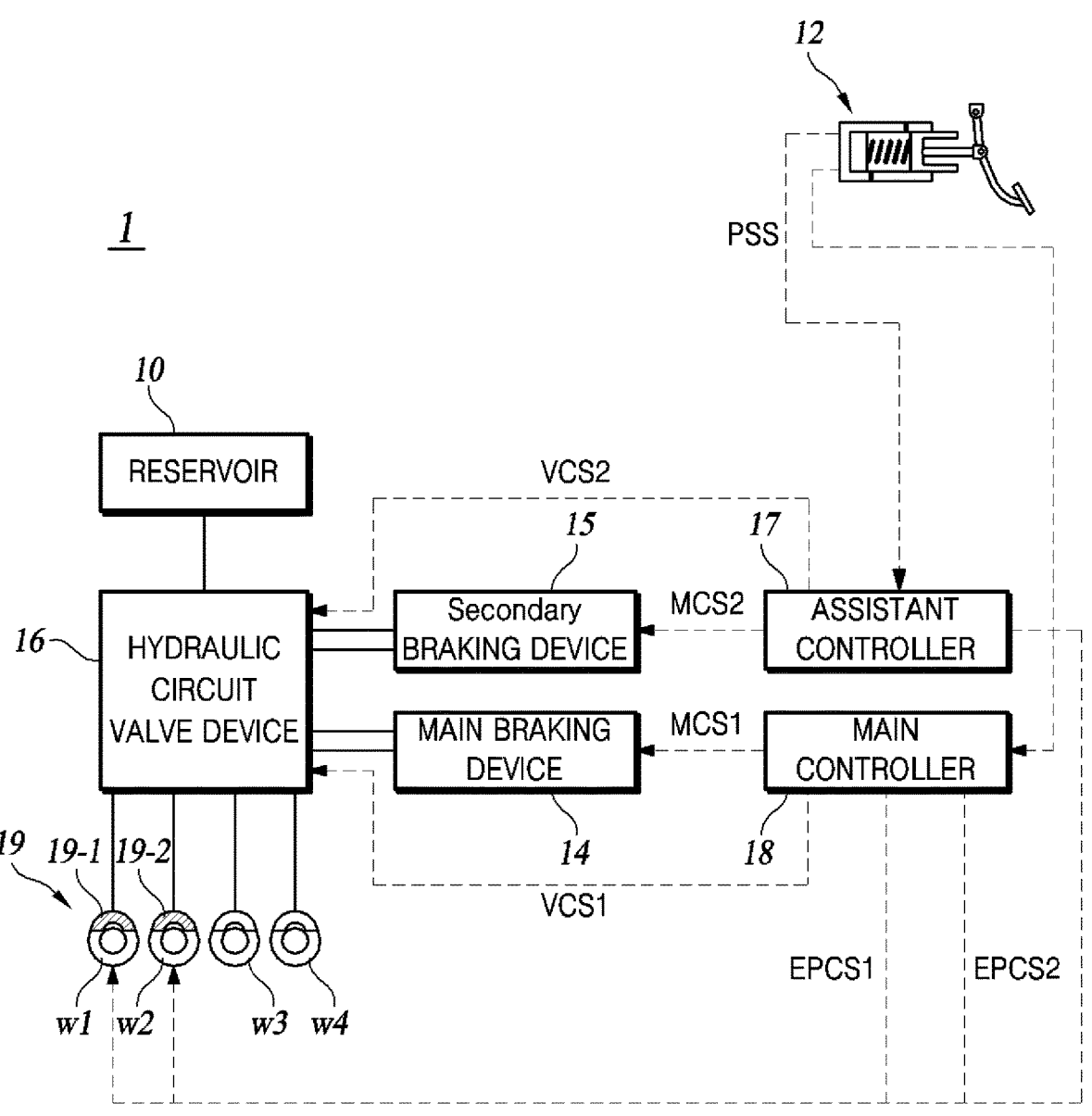
FIG. 1 is a block diagram schematically showing the structure of an electronic hydraulic brake system according to an embodiment of the present disclosure.

Accordingly, the present disclosure provides an electronic hydraulic brake system that can appropriately provide redundancy braking force, that is, an electronic hydraulic brake system that provides a so-called redundancy function, in the situation in which a driver does not drive or gives less attention to driving such as autonomous driving or smart cruise control and a main braking device malfunctions.

Further, the present disclosure provides an electronic hydraulic brake system that has a more space-efficient small size and can perform a required redundancy function.

The objectives of the present disclosure are not limited to the objects described above and other objects will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a block diagram schematically showing the structure of an electronic hydraulic brake system according to an embodiment of the present disclosure.

Figure 2:
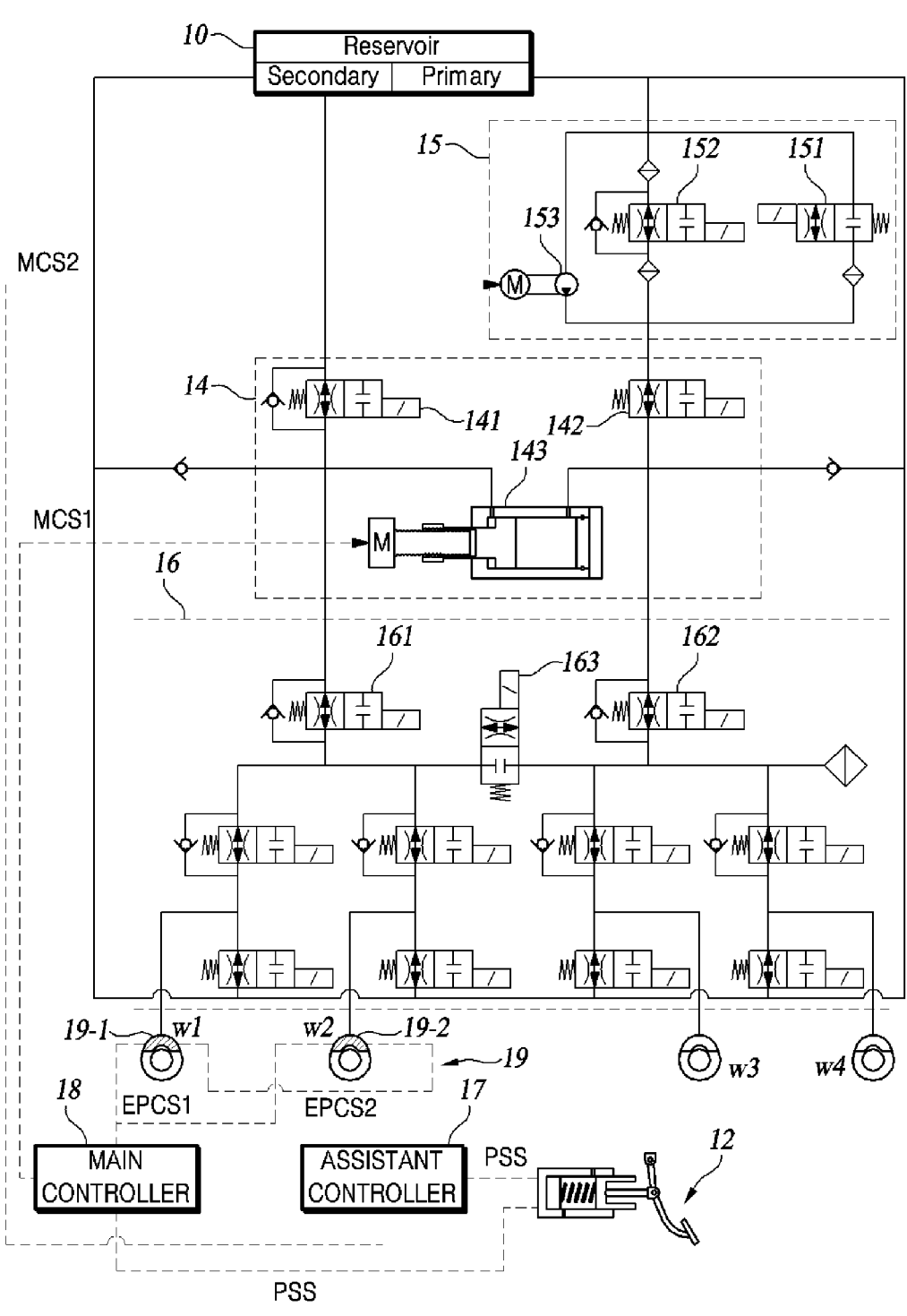
FIG. 2 is a hydraulic circuit diagram schematically showing the structure of the electronic hydraulic brake system according to an embodiment of the present disclosure.

FIG. 2 is a hydraulic circuit diagram schematically showing the structure of the electronic hydraulic brake system according to an embodiment of the present disclosure.

Referring to FIGS. 1 and 2, an electronic hydraulic brake system 1 according to an embodiment of the present disclosure includes a plurality of wheel brake units w1, w2, w3, and w4 supplying braking force to wheel of a vehicle, a main braking device 14 configured to change the pressure of brake oil in cooperation with a main braking motor, a secondary braking device 15 configured to change the pressure of brake oil in cooperation with a secondary braking motor, a hydraulic circuit valve device 16 configured to selectively transmit the hydraulic pressure of brake oil to the plurality of wheel brake units w1, w2, w3, and w4, a main controller 18 configured to control the main braking motor of the main braking device in accordance with braking input PSS, and an assistant controller 17 configured to control the secondary braking motor of the secondary braking device 15 in accordance with braking input PSS.

A reservoir is installed to supplement insufficient liquid when the volume of the liquid is not sufficient in accordance with variation of temperature in a system using liquid, and is also called a reservoir tank.

Brake oil is stored in the reservoir 10 used in the electronic hydraulic brake system 1.

A pedal that is rotated by operation of a user is connected to a pedal simulator 12.

The pedal simulator 12 is configured to provide corresponding reaction force to the pedal with movement of the pedal. Such reaction force may be defined as resistance or pedal effort by a driver when a brake pedal is depressed. In the present disclosure, the pedal simulator 12 does not fluid-communicate with a hydraulic circuit valve device 16 of the brake system. That is, the pedal simulator 12 is separated from the hydraulic circuit valve device in terms of fluid. Further, the pedal simulator 12 is separated from the reservoir 10 as well in terms of fluid. That is, the pedal simulator 12 may be physically integrated with the main braking device 14 and the secondary braking device 15 in the present disclosure, but the present disclosure is not limited to this embodiment and includes the case in which the pedal simulator 12 is provided separately from the main braking device 14 and the secondary braking device 15 to be able to transmit a braking signal.

The pedal simulator 12 according to the present disclosure is not limited to the structure according to the embodiment shown in FIG. 1. The structure and function of the pedal simulator 12 may be configured in various types within the spirit that changes pedal effort and the pressure of brake oil therein.

Further, in the electronic hydraulic brake system according to the present disclosure, the pedal simulator 12 may be omitted. That is, a braking signal may correspond to a braking signal or a deceleration signal that is provided by an autonomous system and a driver may be excluded from driving actions including braking. In this case, the electronic hydraulic brake system according to the present disclosure may be a system, that is, a so-called Braking by Wire (BBW) system in which braking input PSS that is input to the main controller 18 and the assistant controller 17 is a signal generated by an autonomous controller for driving.

The hydraulic circuit valve device 16 fluid-communicates with the main braking device 14, the secondary braking device 15, and the plurality of wheel brake units w1, w2, w3, and w4 and is configured to be able to change a channel inside, that is, a channel in which hydraulic pressure is applied or a channel through which oil flows between the reservoir 10, the main braking device 14, the secondary braking device 15, and the plurality of wheel brake units w1, w2, w3, and w4 in response to a first valve control signal VCS1, VCS1 and a second valve control signal VCS2, VCS2.

The plurality of wheel brake units w1, w2, w3, and w4 is configured to apply braking force to the wheels of a vehicle using hydraulic pressure. The plurality of wheel brake units w1, w2, w3, and w4, for example, may be caliper brakes. The plurality of wheel brake units w1, w2, w3, and w4 may selectively fluid-communicate with one or more of the reservoir 10, the main braking device 14, and the secondary braking device 15 through the hydraulic circuit valve device 16. For example, hydraulic pressure generated at the main braking device 14 or the secondary braking device 15 may be applied to the plurality of wheel brake units w1, w2, w3, and w4 through the hydraulic circuit valve device 16. In this case, the plurality of wheel brake units w1, w2, w3, and w4 can apply braking force corresponding to hydraulic pressure to the wheels of a vehicle. The plurality of wheel brake units w1, w2, w3, and w4 may fluid-communicate with the reservoir 10 through the hydraulic circuit valve device 16. In this case, the hydraulic pressure of the plurality of wheel brake units w1, w2, w3, and w4 may be atmospheric pressure or a pressure corresponding to the atmospheric pressure, and the braking force may be removed.

The main braking device 14 is configured to change the pressure of brake oil inside in correspondence to a first motor control signal MCS1. The main braking device 14 has a hollow structure. The main braking device 14 includes a piston disposed in the internal space thereof and two hydraulic chambers separated by the piston. The piston is configured to reciprocate to a side, that is, between the hydraulic chambers with rotation of a motor.

When the main braking motor is rotated clockwise or counterclockwise by the first motor control signal MCS1, the piston moves to a side or another side and can separately press the brake oil in the two hydraulic chambers.

The main braking device 15 may selectively fluid-communicate with one or more of the reservoir 10, the secondary braking device 15, and the plurality of wheel brake units w1, w2, w3, and w4 through the hydraulic circuit valve device 16.

The secondary braking device 15 is configured to change the pressure of brake oil inside in correspondence to a second motor control signal MCS2. The secondary braking device 15 may be an oil pump structure, and for example, may be configured to pump brake oil with rotation of the secondary braking motor when the secondary braking motor is operated by a second motor control signal MCS2. An oil flow path passing through the secondary braking device 15 can be transmitted to the plurality of wheel brake units w1, w2, w3, and w4 through the hydraulic circuit valve device 16. In detail, the hydraulic pressure generated at the secondary braking device 15 can be transmitted to channels of wheels sequentially through a second main braking valve 142 and a second traction control valve 162. Further, referring to FIGS. 2 to 7, the secondary braking device 15 according to an embodiment of the present disclosure is disposed between a chamber formed ahead of the piston of the main braking device 14 and the reservoir 10.

However, in an embodiment of the present disclosure, the secondary braking device 15 may be a pump having a small capacity or a pump having small output in comparison to the main braking device 14. Accordingly, the secondary braking device 15 may be configured to supply hydraulic pressure only to one, two, or three wheel brake units of four wheel brake units. In the embodiment of the present disclosure shown in the figures, the secondary braking device 15 is configured to transmit hydraulic pressure to only two wheel brake units w3 and w4 through the hydraulic circuit valve device 16.

The hydraulic circuit valve device 16 fluid-communicates with one or more of the reservoir, the main braking device 14, and the secondary braking device 15, and the plurality of wheel brake units w1, w2, w3, and w4.

The hydraulic circuit valve device 16 is configured to be able to change an oil flow path inside, that is, an oil flow path through which oil is transmitted between the reservoir, the main braking device 14, and the secondary braking device 15, and the plurality of wheel brake units w1, w2, w3, and w4, in response to the first valve control signal VCS1 of the main controller 110 and the second valve control signal VCS2 of the assistant controller.

In an embodiment of the present disclosure, the hydraulic circuit valve device 16 includes some or all of a plurality of main braking control valves 24 related to the operation of the main braking device 14, a plurality of secondary braking control valves 25 related to the operation of the secondary braking device 15, and a plurality of posture control valves 26 related to posture control of a vehicle.

The plurality of main braking control valves 24 may include a first main braking control valve 141 that opens/closes a hydraulic pressure path between the reservoir 10 and the main braking device 14 and a hydraulic pressure path between the reservoir 10 and the posture control valves 26, and a second main braking control valve 142 that opens/closes a hydraulic pressure path between the secondary braking device 15 and the main braking device 14 and a hydraulic pressure path between the secondary braking device 15 and the posture control valves 26.

The second main braking valve 142 is disposed between a forward chamber of the main braking device 14 and the reservoir. The second main braking valve 142 is configured such that whether to transmit hydraulic pressure to the wheel brake units from the secondary braking device is determined in accordance with opening/closing of the second main braking valve. When a wheel brake is pressed, the second main braking valve 142 is closed, thereby preventing working fluid in the forward chamber from being transmitted to the reservoir 10.

The plurality of secondary braking control valves 25 may include a first assistant braking valve 151 and a second assistant braking valve 152 that open/close a hydraulic pressure path between the reservoir 10 and the second main braking valve 142.

The first assistant braking valve 151 and the second assistant braking valve 152 are disposed in parallel between the second main braking valve 142 and the reservoir 10. The first assistant braking valve 151 and the second assistant braking valve 152 are configured to adjust the hydraulic pressure at the wheel brake units.

The first assistant braking valve 151 is open during normal times and is used to control a set pressure at wheels connected with some wheel brakes w3 and w4. In detail, when braking pressure is transmitted to some wheel brakes w3 and w4, the amount of fluid required to generate the intended braking pressure is sent to the wheels and the other amount of fluid is sent to the reservoir 10. Accordingly, it is possible to generate braking pressure as intended at the wheel brakes w3 and w4.

Figure 7:
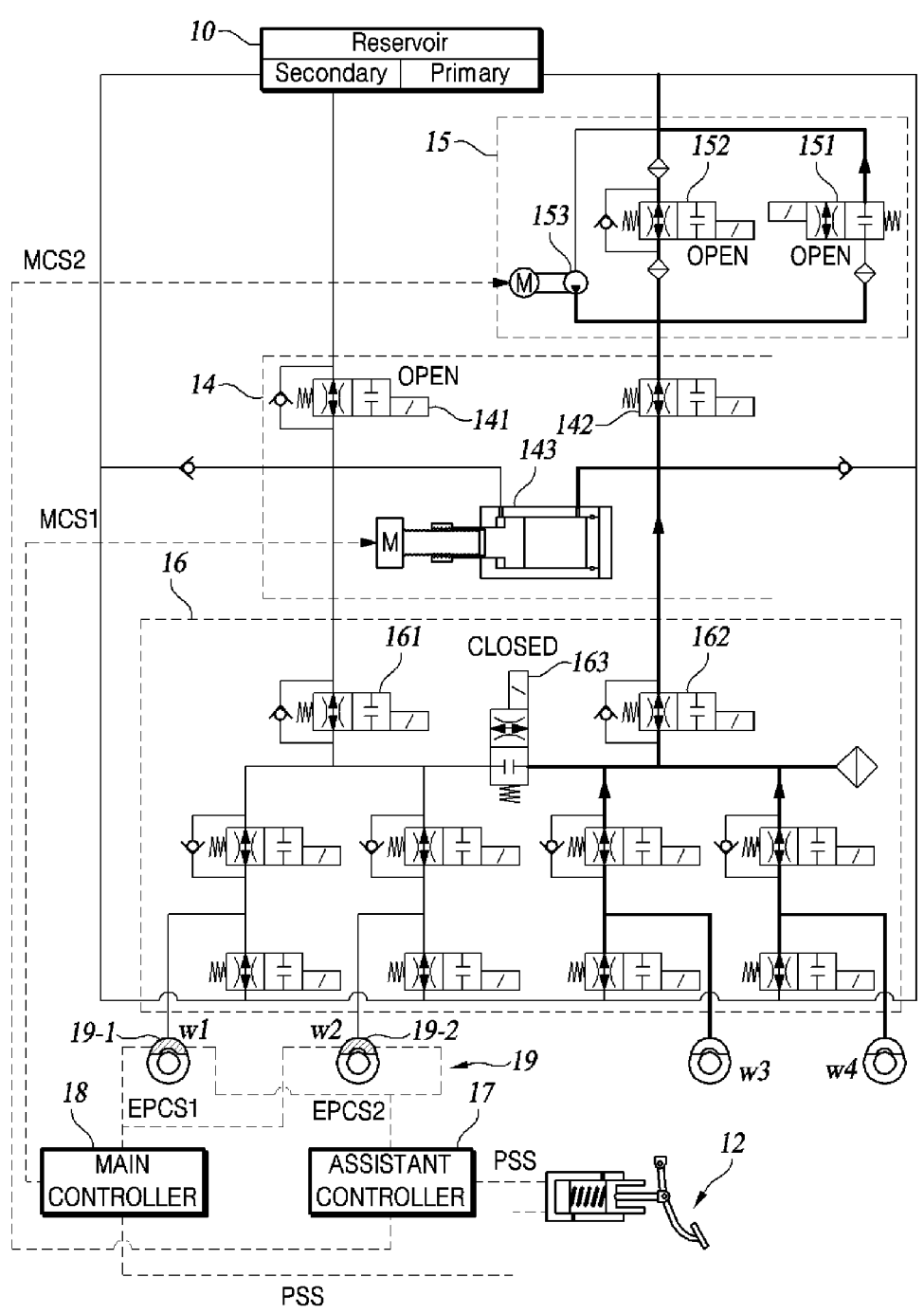
FIG. 7 is a diagram showing a hydraulic pressure state in a redundancy braking stop operation.

The second assistant braking valve 152 is open or closed during normal times, depending on whether a current is applied, and is configured to be opened when there is a problem with the main braking unit, as in FIG. 7, and when the pressure of a wheel to which the secondary braking device 15 transmits hydraulic pressure is decreased.

When pressure at the wheel brake units is decreased, the second main braking valve 142 is opened, so working fluid is transmitted from the forward chamber of the main braking device 14 to the second main braking valve 142. Since the second main braking valve 142 is open, working fluid is transmitted to the first assistant braking valve 151 and/or the second assistant braking valve 152 from the second main braking valve. When the pressure of the wheel brakes is decreased, working fluid is transmitted to the reservoir because that first assistant braking valve 151 and/or the second assistant braking valve 152 is open. That is, working fluid is sequentially transmitted to the forward chamber, the second main braking valve 142, the first and second assistant braking valves 151 and 152, and the reservoir 10.

The plurality of posture control valves 26 is configured to adjust hydraulic pressure that is applied to the plurality of wheel brake units w1, w2, w3, and w4 on the basis of a posture control signal of the controller 110. The posture control valves 26 are configured to open/close the oil flow path between the main braking device 14 and the plurality of wheel brake units w1, w2, w3, and w4 or the oil flow path between the secondary braking device 15 and the plurality of wheel brake units w1, w2, w3, and w4 on the basis of a posture control signal.

The posture control valves 26 are configured to independently control the braking force of each of the plurality of wheel brake units w1, w2, w3, and w4 and are configured to implement the functions of an Anti-lock Braking System (ABS), a Traction Control system (TCS), and Electronic Stability Control (ECS).

The posture control valves 26 include four pairs of inlet valves and outlet valves provided such that one inlet valve and one outlet valve are disposed in each brake channel for directly supplying oil to each of the wheel brake units w1, w2, w3, and w4 or discharging oil. Further, the posture control valves 26 include a first traction control valve 161, a second traction control valve 162, and a mixing valve 163 for distributing hydraulic pressure generated from the main braking device 14 or the secondary braking device 15 to each brake channel.

Further, when the main braking device 14 or the main controller 18 malfunctions, the secondary braking motor of the secondary braking device 15 is operated in accordance with the second motor control signal MCS2 of the assistant controller 17. The secondary braking device 15 operation in cooperation with the secondary braking motor transmits pressed brake oil to the hydraulic circuit valve device 16. The brake oil is transmitted to the plurality of wheel brake units w1, w2, w3, and w4, so effective redundancy braking by electronic control can be achieved in a redundancy braking situation.

That is, according to the present disclosure, it is possible to appropriately provide redundancy braking force even if a main braking device malfunctions in the situation in which a driver does not drive or gives less attention to driving such as smart cruise control or autonomous driving.

Further, the present disclosure further includes an additional device having a similar function in consideration of the possibility of malfunction in devices that perform an electronic control type brake function, so it is possible to implement a brake system that can prevent the possibility of problems due to such malfunction and secures so-called redundancy. In particular, according to the present disclosure, it is possible to achieve an appropriate braking function in a situation with malfunction of a main braking device by only adding a pump and a valve system without actually employing a separate additional brake system in terms of securing such redundancy.

The main controller 18 controls control valves of the hydraulic circuit valve device 16 and a motor operating in cooperation with the main controller 14 such that braking force corresponding to the degree of rotation of a pedal and braking input PSS that is provided from an autonomous device is generated. The main controller 18 can generate and transmit a first motor control signal for controlling the main control motor operating in cooperation with the main braking device 14 to the main braking motor. The hydraulic pressure generated by the main braking device 14 is transmitted to the plurality of wheel brake units w1, w2, w3, and w4 through the hydraulic circuit valve device 16. In this case, the main controller 18 forms an oil flow path between the main braking device 14 and the plurality of wheel brake units w1, w2, w3, and w4 by transmitting a first adjustment signal for adjusting whether to open/close electronic valves of the hydraulic circuit valve device 16 to the electronic valves of the hydraulic circuit valve device 16.

The assistant controller 17 generates and transmits a second motor signal MCS2 for providing redundancy braking force to the secondary braking motor of the secondary braking device 15 in accordance with braking input PSS in a redundancy braking situation.

In the specification, the PSS may be understood as an electronic signal generated on the basis of pedal input by a user or a braking signal provided from a specific autonomous device, for example, a pedal sensing signal PSS.

In an embodiment of the present disclosure, the main controller 18 may be configured as a separate driving circuit that is physically discriminated from the assistant controller 17. That is, according to the present disclosure, even if a driving circuit that performs the function of the main controller 18 malfunctions, an assistant driving circuit that performs the function of the assistant controller 17 appropriately performs a redundancy braking function, so redundancy can be secured.

Further, the electronic brake according to an embodiment of the present disclosure may further include an electronic parking brake mounted on one or more wheels.

In an embodiment of the present disclosure, it is exemplified that an electronic parking brake is integrally mounted on two wheel brake units of rear wheels.

Two electronic parking brakes are configured to be controlled by a first parking brake signal EPCS1 and a second parking brake signal EPCS2 of the main controller 18 and the assistant controller 17, respectively.

In an embodiment of the present disclosure, the secondary braking device 15 may be a pump having a small capacity or a pump having small output in comparison to the main braking device 14. Accordingly, in a redundancy situation in which braking is made by a secondary braking unit and the secondary braking device 15, the assistant control unit can brake front wheels by supplying hydraulic pressure to the wheel brake units w3 and w4 of the front wheel through the secondary braking device 15, and the assistant control unit can brake rear wheels by applying the second parking brake signal EPCS2 to the electronic parking brake of the rear wheels.

Next, how the hydraulic circuit valve device 16 described above selectively transmits the hydraulic pressure, which is supplied from the main braking device and the secondary braking device 15, to the plurality of wheel brake units w1, w2, w3, and w4 and how the hydraulic pressure supplied to the plurality of wheel brake units w1, w2, w3, and w4 is removed are described with reference to FIGS. 2 to 7.

Figure 3:
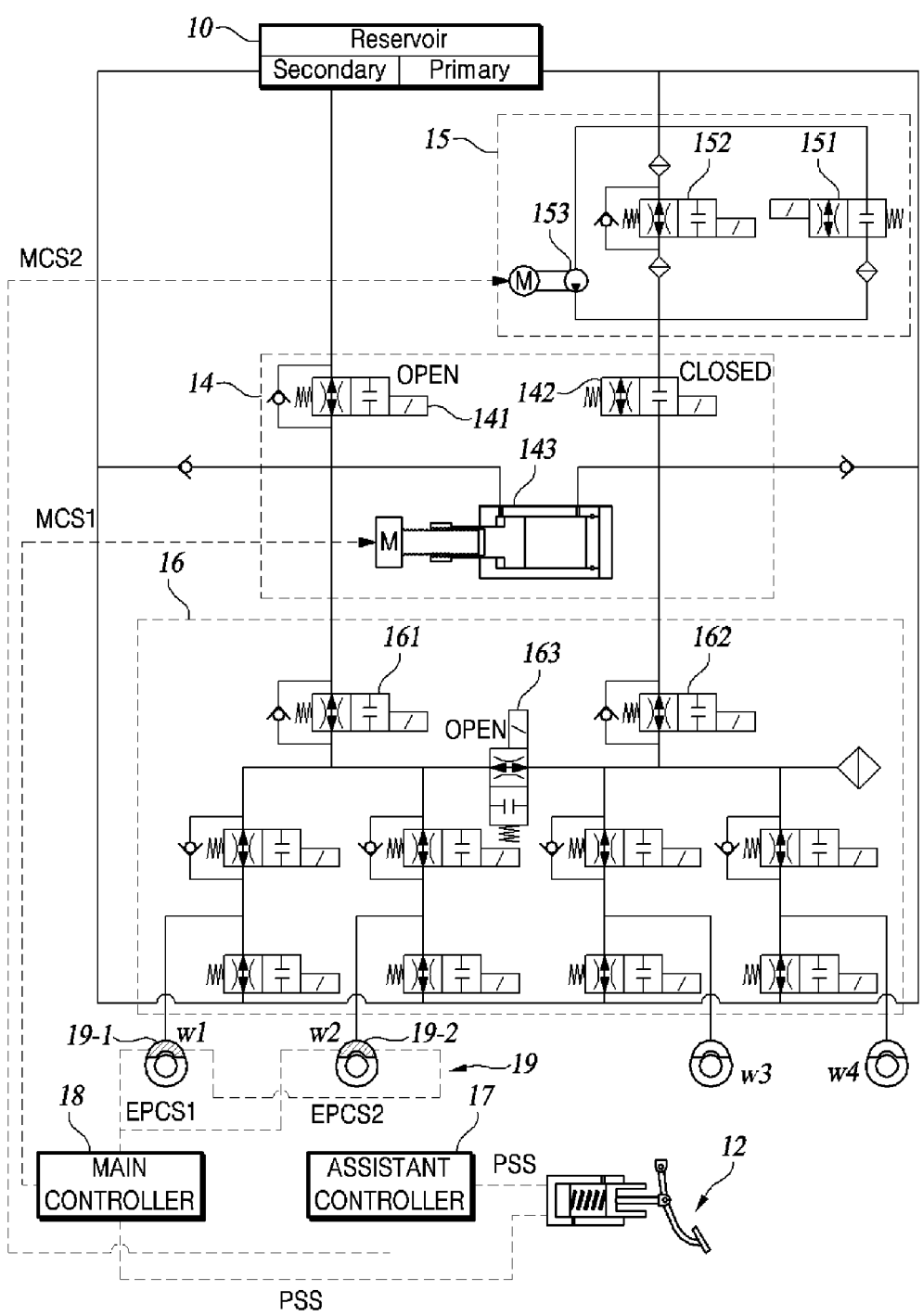
FIG. 3 is a diagram showing a hydraulic pressure state generated in a braking standby system in starting-up.

FIG. 3 is a diagram showing a hydraulic pressure state generated in a braking standby system in starting-up.

As shown in FIG. 3, in starting-up, the first main braking valve forms a hydraulic pressure path between a rearward chamber of the main braking device 14 and the reservoir 10 by opening, and the second main braking valve 142 blocks the hydraulic pressure path between the secondary braking device 15 and the main braking device 14 by closing. The forward chamber of the main braking device 14 can be filled with brake oil flowing inside from the reservoir 10 through a check valve in accordance with a rearward stroke of the main braking device 14.

In this case, the mixing valve is opened, so each brake channel commonly forms a hydraulic pressure path together with the main braking device 14.

Figure 4:
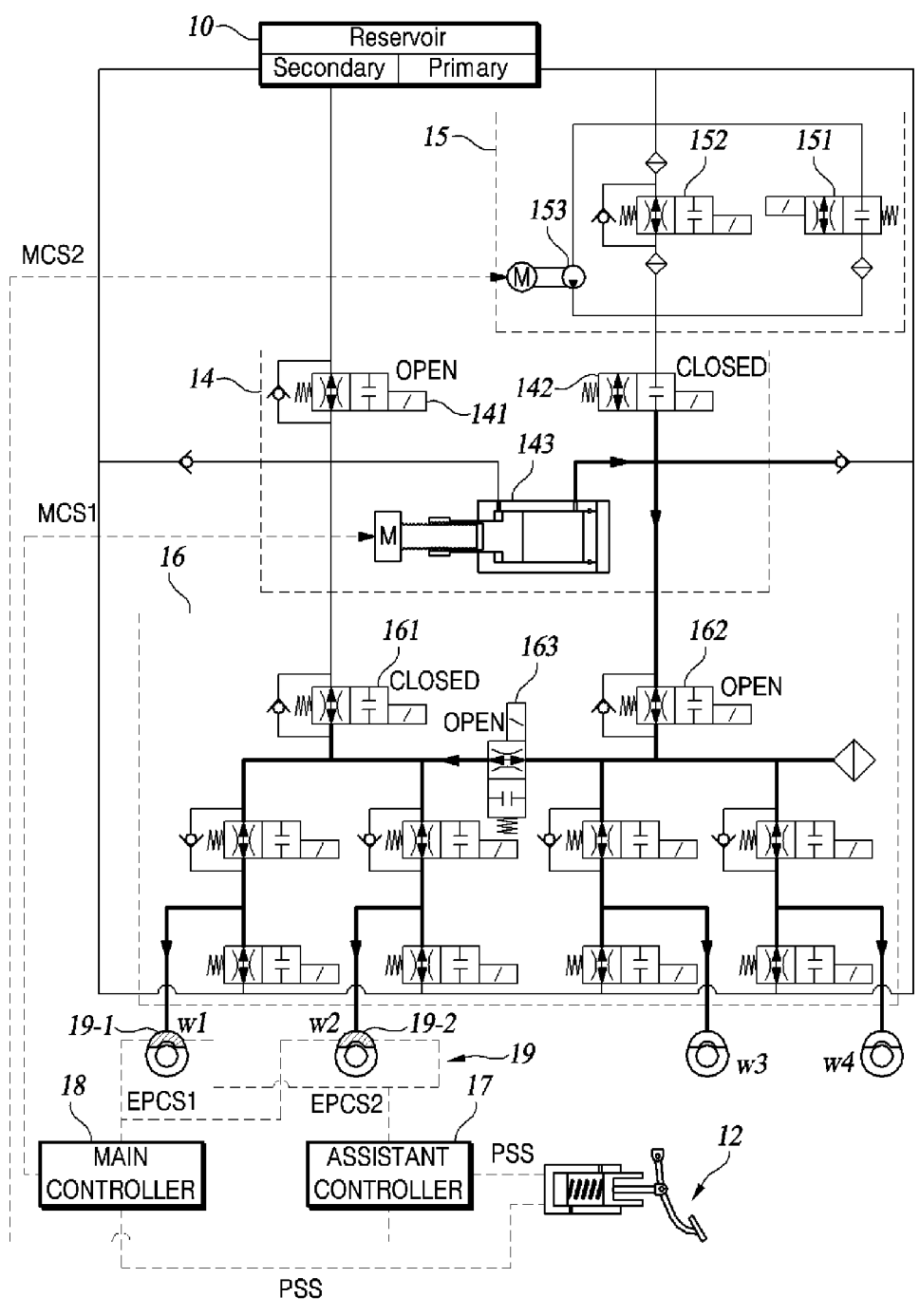
FIG. 4 is a diagram showing a hydraulic pressure state in a normal braking operation.

FIG. 4 is a diagram showing a hydraulic pressure state in a normal braking operation.

In this case, the normal braking operation, which is a state in which a driver applies braking input PSS to the pedal simulator or a driving controller generates and inputs barking input PSS to the main controller 18 and the assistant controller 17, means a state in which the main controller 18 and the main braking device 14 do not malfunction.

Referring to FIG. 4, in a normal braking operation, the piston of the main braking device 14 performs a forward stroke and hydraulic pressure is generated in the brake oil in the forward chamber.

In this case, the first traction control valve 161 and the second main braking valve 142 are kept closed. Further, the second traction control valve 162 and the mixing valve 163 are kept open.

Accordingly, the hydraulic pressure transmitted through the forward chamber of the main braking device 14 can be transmitted to the plurality of wheel brake units w1, w2, w3, and w4 through respectively brake channels.

In this case, the hydraulic pressure that is supplied to each of the wheel brake units w1, w2, w3, and w4 can be separately adjusted by opening/closing certain inlet valve, outlet valve, traction valve, and mixing valve and adjusting the main braking device 14 in accordance with necessity.

Figure 5:
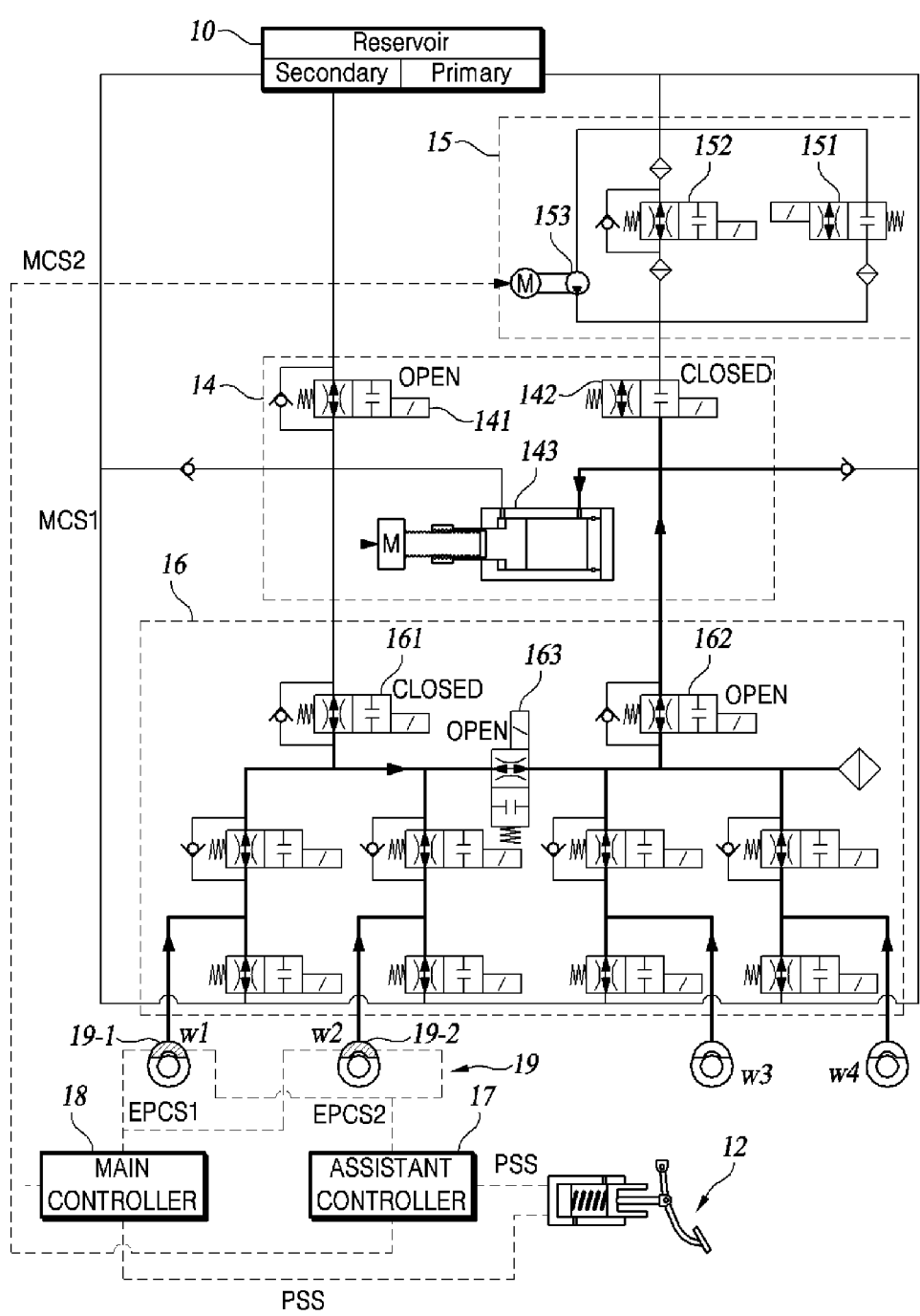
FIG. 5 is a diagram showing a hydraulic pressure state in a normal braking stop operation.

FIG. 5 is a diagram showing a hydraulic pressure state in a normal braking stop operation.

In this case, the normal braking stop operation, which is a state in which a driver removes braking input PSS applied to the pedal simulator (the pedal is returned) or a driving controller generates and inputs barking stop input to the main controller 18 and the assistant controller 17, means a state in which the main controller 18 and the main braking device 14 do not malfunction.

Referring to FIG. 5, in a normal braking stop operation, the piston of the main braking device 14 performs a rearward stroke and brake oil in the forward chamber is filled again. That is, negative pressure is generated in the forward chamber of the main braking device 14.

In this case, the first traction control valve 161 and the second main braking valve 142 are kept closed. Further, the second traction control valve 162 and the mixing valve 163 are kept open.

Accordingly, the brake oil supplied to the plurality of wheel brake units w1, w2, w3, and w4 can be returned to the forward chamber of the main braking device 14 through the brake channels, respectively.

In this case, the hydraulic pressure set for each of the wheel brake units w1, w2, w3, and w4 can be separately adjusted by opening/closing certain inlet valve, outlet valve, traction valve, and mixing valve and adjusting the main braking device 14 in accordance with necessity.

Figure 6:
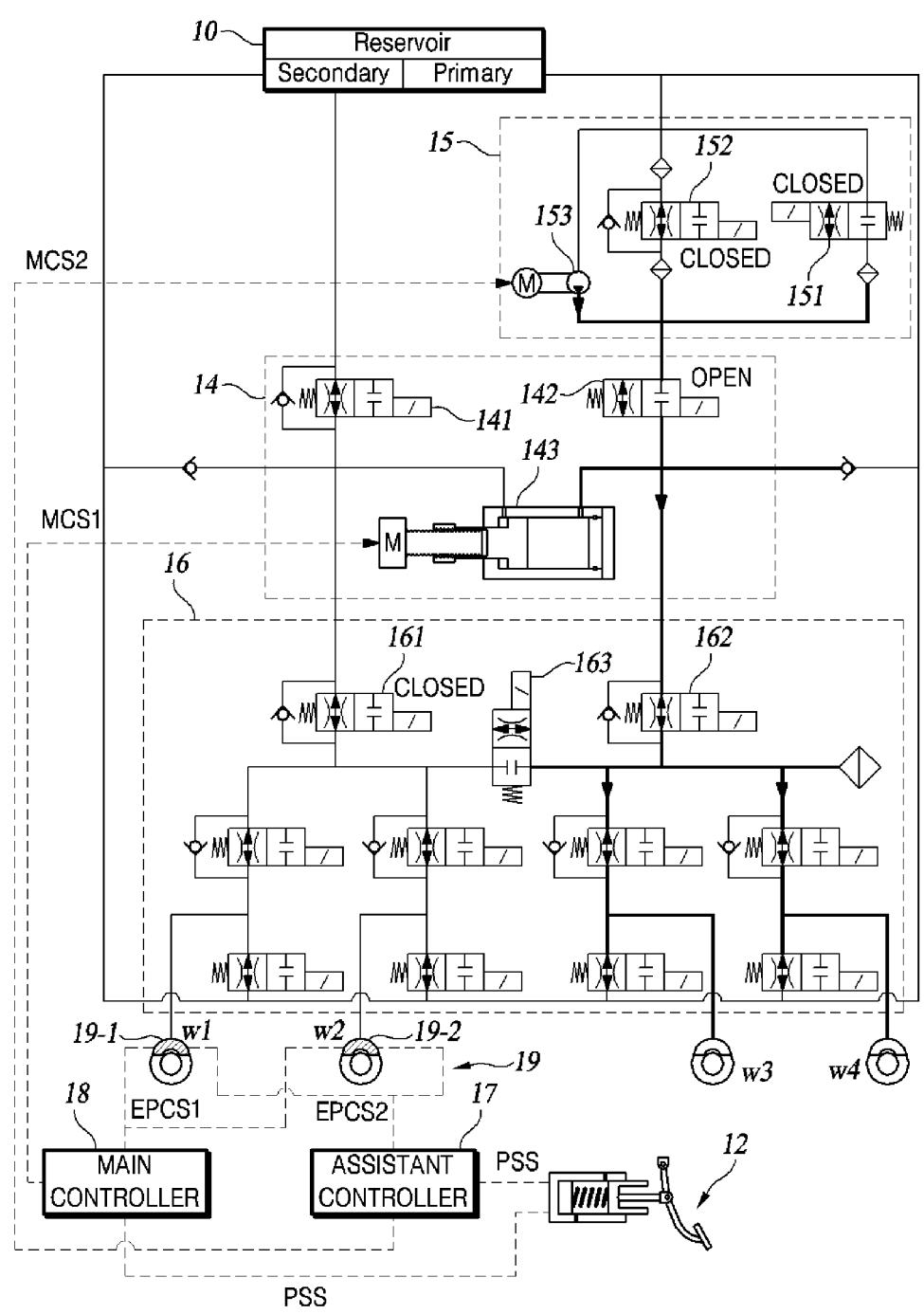
FIG. 6 is a diagram showing a hydraulic pressure state in a redundancy braking operation.

FIG. 6 is a diagram showing a hydraulic pressure state in a redundancy braking operation.

In this case, the redundancy braking operation, which is a state in which a driver applies braking input PSS to the pedal simulator or a driving controller generates and inputs barking input PSS to the main controller 18 or the assistant controller 17, means a state in which one or more of the main controller 18 or the main braking device 14 malfunctions.

Referring to FIG. 6, in the redundancy braking operation, hydraulic pressure is generated by the secondary braking device. In an embodiment of the present disclosure, the secondary braking device may be an oil pump. That is, the second motor control signal MCS2 is applied to the secondary braking motor of the secondary braking device 15, so the secondary braking device 15 can generate hydraulic pressure.

In this case, the first traction control valve 161 and the mixing valve 163 are kept closed. Further, the second traction control valve 162 and the second main braking valve 142 are kept open.

Accordingly, the hydraulic pressure generated by the secondary braking device 15 can be transmitted to a pair of wheel brake units w3 and w4, that is, one brake circuit through a pair of brake channels.

In an embodiment of the present disclosure, it is exemplified that the hydraulic pressure generated by the secondary braking device 15 is supplied to wheel brake units w3 and w4 mounted on the front wheel of a vehicle in the redundancy braking operation. However, the present disclosure is not limited thereto, and if necessary, the mounting positions of the wheel brake units to which hydraulic pressure is supplied in the redundancy braking operation may be changed.

Further, in an embodiment of the present disclosure, wheels to which hydraulic pressure is not supplied may be braked using electronic parking brakes (EPB) 19_1 and 19_2 in the redundancy braking operation.

That is, in the redundancy braking operation, the assistant controller 17 can generate required braking force by operation all of the electronic parking brakes and the secondary braking device 15 in accordance with required braking input PSS.

For example, when the required braking input PSS is small, the hydraulic pressure generated using the secondary braking device 15 may be supplied to a pair of wheel brakes and braking force may not be applied to the other one pair of wheel brakes in consideration of the lifespan of the electronic parking brake.

In another embodiment of the present disclosure, when required braking force is sufficiently small, it may be possible to supply the hydraulic pressure generated by the secondary braking device 15 to all of four wheel brake units w1, w2, w3, and w4 by opening the mixing valve.

FIG. 7 is a diagram showing a hydraulic pressure state in a redundancy braking stop operation.

In this case, the redundancy braking stop operation, which is a state in which a driver removes braking input PSS applied to the pedal simulator (the pedal is returned) or a driving controller generates and inputs barking stop input to the main controller 18 and the assistant controller 17, means a state in which the main controller 18 and the main braking device 14 malfunction.

Referring to FIG. 7, in the redundancy braking stop operation, the operation of the secondary braking device 15 is stopped. Hydraulic pressure supplied to a pair of wheel brake systems w3 and w4 may be returned to the reservoir, depending on a pressure gradient.

In the embodiment shown in the figure, the second main braking valve 142, the second traction control valve 162, the first assistant braking valve 151, or the second assistant braking valve 152 is kept open. Further, the mixing valve 163 is kept closed.

Accordingly, the brake oil supplied to the pair of wheel brake systems w3 and w4 can be returned to each reservoir 10.

However, in this case, the hydraulic pressure set for each of the wheel brake units w1, w2, w3, and w4 can be separately adjusted by opening/closing certain inlet valves, outlet valves, traction valves, and mixing valves and adjusting the main braking device 14 in accordance with necessity.

Further, the assistant controller 17 can remove the braking force that is supplied to another pair of wheel by controlling the electronic parking brakes mounted on the pair of wheels.

As described above, according to the present disclosure, a normal braking control operation can be performed by the main controller 18 and the main braking device 14, and when the main controller 18 or the main braking device 14 malfunctions, it is possible to perform appropriate braking using the assistant controller 17 and the secondary braking device 15.

Figure 8:
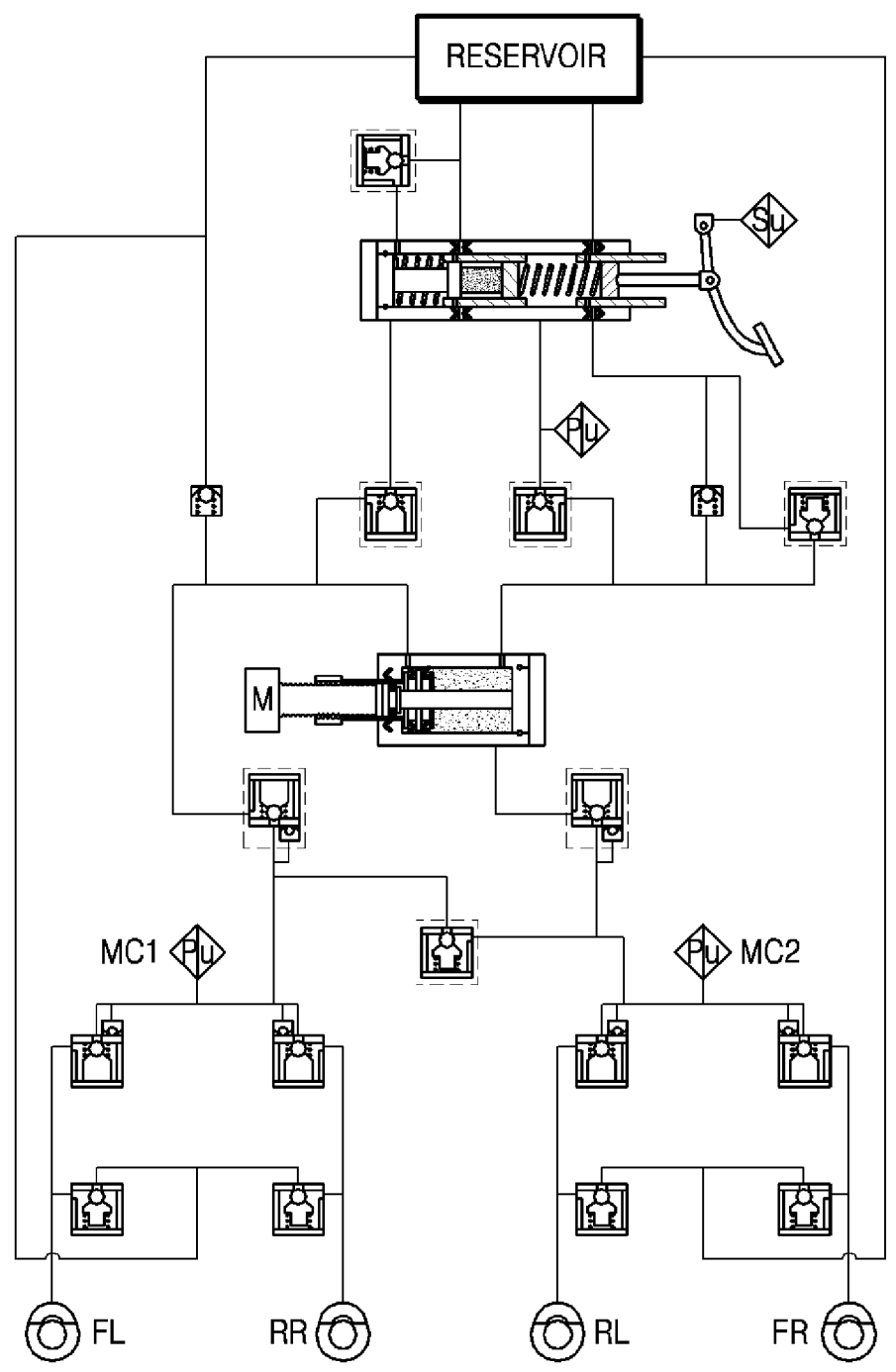
FIG. 8 is a block diagram showing an example of an electronic hydraulic brake system of the related art.

The noticeable point is that the electronic brake according to the present disclosure does not employ a backup master cylinder that is directly connected to a pedal and manually generates hydraulic pressure and the secondary braking device 15 is installed using the space, as compared with the brake system of the related art introduced through FIG. 8.

That is, according to the present disclosure, a redundancy system will be securely provided as long as the secondary braking device 15 that can be physically and electrically independently driven from the main controller 18 and it is possible to supplement insufficient braking force using an electronic parking brake while installing a secondary braking device that can appropriately generate required braking hydraulic pressure although having a smaller capacity than the main braking device 14, which is based on specific consideration that there is no need for a backup master cylinder that is a manual control unit.

Further, since a backup master cylinder is removed, it is possible to use the corresponding space as a space for installing the secondary braking device 15, there is an advantage in that the size of the entire electronic brake system can still maintain the size of a brake system of the related art.

The present disclosure can provide an electronic hydraulic brake system that can appropriately provide redundancy braking force, that is, an electronic hydraulic brake system that provides a so-called redundancy function, in the situation in which a drive does not drive or gives less attention to driving such as autonomous driving or smart cruise control and a main braking device malfunctions.

Further, the present disclosure can provide an electronic hydraulic brake system that has a more space-efficient small size and can perform a required redundancy function.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electronic brake configured to generate a braking pressure for braking a vehicle electronically, without master cylinder hydraulics, the electronic brake comprising:

a plurality of wheel brake units configured to supply a braking force to a plurality of wheels of a vehicle;

a main braking device comprising a main electronic braking motor configured to generate a first brake oil pressure;

a secondary braking device comprising a secondary electronic braking motor configured to generate a second brake oil pressure;

a hydraulic circuit valve device configured to receive the first brake oil pressure from the main braking device and the second oil pressure from the secondary braking device and to selectively transmit, to the plurality of wheel brake units, the first or second brake oil pressure;

a main controller configured to control the main braking motor based on a braking input indicated by a braking signal; and an assistant controller configured to:

control the secondary braking motor based on the braking input indicated by the braking signal; and control the hydraulic circuit valve device to transmit the second brake oil pressure to a portion of the plurality of wheel brake units when the main controller or the main braking device malfunctions, wherein:

the electronic brake further comprises a pedal simulator connected to a brake pedal that is configured to generate the braking signal based on a magnitude of a driver's force used to press the brake pedal of the vehicle, and the pedal simulator and the pedal are separated from hydraulics of the electronic brake, the main braking device has a double-acting piston-piston structure including a piston disposed in an internal space of the main braking device and two hydraulic pressure chambers separated by the piston, the secondary braking device comprises an oil pump, a second main braking valve is disposed on a hydraulic path between a reservoir and a forward chamber of the two hydraulic pressure chambers, the forward chamber being positioned in front of the piston of the main braking device, the second main braking valve is configured to selectively transmit a working fluid from the secondary braking device to the portion of the plurality of wheel brake units depending on whether the second main braking valve is open or closed, and when the hydraulic pressure at the plurality of wheel brake units is decreased and the second main braking valve is opened, the working fluid is transmitted from the forward chamber to the reservoir via the secondary braking device.

2. The electronic brake of claim 1, wherein, when one of the main controller and the main braking device malfunctions:

the secondary braking motor is configured to operate based on a second motor control signal generated by the assistant controller, the secondary braking device is configured to transmit a hydraulic pressure to one or more wheel brake units of a first portion of the plurality of wheel brake units, and the assistant controller is configured to control, using an electronic parking brake coupled to one or more wheel brake units of a second portion of the plurality of wheel brake units, a braking force provided to the wheel brake units of the second portion.

3. The electronic brake of claim 1, further comprising first and second assistant braking valves disposed in parallel with each other between the second main braking valve and the reservoir and configured to adjust the hydraulic pressure at the portion of the plurality of wheel brake units.

\* \* \* \* \*